United States Patent [19]
Zackrisson et al.

[11] Patent Number: 5,127,975
[45] Date of Patent: Jul. 7, 1992

[54] METHOD OF FABRICATION OF COMPOSITE REINFORCED DRIVE SHAFT HAVING END FITTINGS SECURED THERETO

[75] Inventors: Barry L. Zackrisson, Richfield Center; John A. Beckman, Toledo, both of Ohio

[73] Assignee: Dana Corporation, Toledo, Ohio

[21] Appl. No.: 398,620

[22] Filed: Aug. 25, 1989

Related U.S. Application Data

[62] Division of Ser. No. 259,484, Oct. 17, 1988, Pat. No. 4,888,224.

[51] Int. Cl.⁵ .................... B65H 81/00; F16C 3/00
[52] U.S. Cl. ........................ 156/171; 156/172; 156/187; 156/188; 156/190; 156/193; 156/267; 464/181; 464/182; 464/903
[58] Field of Search ............ 156/171, 169, 172, 187, 156/188, 190, 192, 193, 428, 430–432, 267; 464/181, 182, 902, 903

[56] References Cited

U.S. PATENT DOCUMENTS

| | | | |
|---|---|---|---|
| 2,723,705 | 11/1955 | Collins | 156/432 X |
| 2,731,067 | 1/1956 | Miller | 156/432 X |
| 3,249,481 | 5/1966 | Boggs | 156/432 X |
| 3,306,797 | 2/1967 | Boggs | 156/171 |
| 3,676,258 | 7/1972 | Jackson | 156/432 X |
| 3,769,127 | 10/1973 | Goldsworthy et al. | 156/432 X |
| 3,855,031 | 12/1974 | McNeely et al. | 156/428 X |
| 4,125,423 | 11/1978 | Goldsworthy | 156/432 X |
| 4,171,626 | 10/1979 | Yates et al. | 464/181 |
| 4,214,932 | 7/1980 | Van Auken | 156/187 |
| 4,248,062 | 2/1981 | McLain et al. | 464/181 |
| 4,527,978 | 7/1985 | Zackrisson | 464/182 X |

Primary Examiner—Jeff H. Aftergut
Attorney, Agent, or Firm—MacMillan, Sobanski & Todd

[57] ABSTRACT

The present invention relates to a unique fiber-reinforced metallic tubular element, along with a unique method for producing such tubular elements on a production basis. The tubular element includes a cylindrical aluminum tube surrounded by a fiber composite sleeve which includes a plurality of individual reinforcing graphite fibers oriented parallel to the longitudinal axis of the tube and uniformly positioned about the circumference of the tube. In the preferred embodiment of the invention, an isolation layer is positioned between the graphite reinforcing layer and the outer surface of the aluminum tube, and a protective covering layer of fiber material surrounds the tube and is adhered to the outer surface of the graphite reinforcing layer. In the preferred method of the present invention, a plurality of cylindrical metal tubes are coupled to one another in an end-to-end relationship by a plurality of joining plug members to form a longitudinally extending series of metal tubes. The series of metal tubes are fed along a longitudinal axis to an apparatus for applying the individual layers of the composite fiber sleeve along with a curable resin material to the tube. As the series of tubes having the cured composite sleeve thereon exits the apparatus, the tubes are severed at each of the joining plugs to produce a plurality of individual fiber reinforced tubular elements. Alternate methods of manufacturing the fiber reinforced tubular elements are also disclosed. In the preferred embodiment of the invention, the fiber reinforced tubular element is utilized as a vehicle drive shaft.

10 Claims, 2 Drawing Sheets

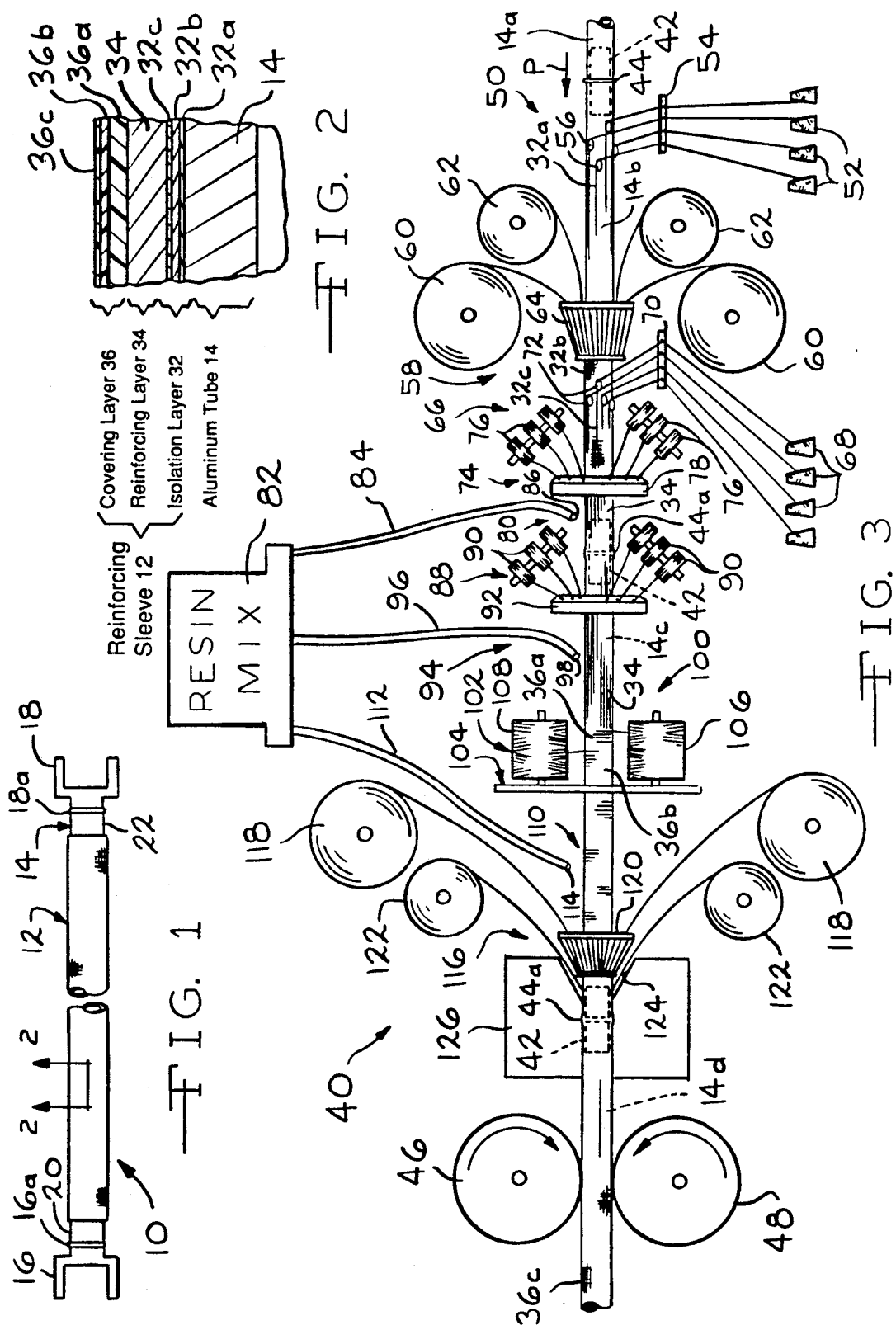

METHOD OF FABRICATION OF COMPOSITE REINFORCED DRIVE SHAFT HAVING END FITTINGS SECURED THERETO

This is a division of application Ser. No. 07/259,484, filed Oct. 17, 1988, now U.S. Pat. No. 4,888,224.

BACKGROUND OF THE INVENTION

The present invention relates generally to fiber reinforced tubular elements such as vehicle drive shafts and, in particular, to a graphite reinforced aluminum drive shaft and a method for producing such a drive shaft.

Over the past decade, there has been an ongoing endeavor by the industry to reduce the weight of vehicles in order to improve fuel economy. In addition to downsizing and redesigning vehicles to make the most efficient use of the available space, a great deal of attention has been given to constructing various vehicular components of lighter weight materials. For example, in the area of drive shafts, it has been proposed to replace conventional steel drive shafts with lighter weight aluminum tubes. However, depending on the length of the drive shaft, and the maximum speed at which the drive shaft is to be rotated, vibration problems can arise.

While typically the tubular steel or aluminum drive shafts are adequate to transmit the torsional forces involved, there is a tendency for a shaft to "whip" or resonate mechanically when the shaft reaches a certain vehicle speed, typically referred to as a critical speed. Consequently, in order to overcome the critical speed limitations of single long drive shafts, typically multiple sections of shafts are employed. In these instances, adjacent individual drive shaft sections are connected to one another by means of a universal joint assembly which in turn is supported by a bearing mounting unit affixed to the vehicle frame.

In order to accommodate a longer drive shaft such that the universal joint assemblies and the bearing mounting units can be eliminated, it has been proposed to reinforce metal tubes with a fiber reinforced sleeve portion to increase the axial stiffness of the shaft without substantially increasing its weight. For example, U.S. Pat. Nos. 4,131,701; 4,173,670; and 4,214,932 all disclose fiber composite aluminum drive shafts wherein aluminum tubes are wrapped with alternating layers of resin-impregnated woven fiberglass cloth and resin-impregnated fiber reinforcing sheets. The reinforcing sheets are comprised of continuous unindirectional graphite fiber layers, with the graphite fibers arranged at angles between $\pm 5°$ to $\pm 20°$ with respect to the longitudinal axis of the tube. Another approach to reinforcing a tubular metallic drive shaft is disclosed in U.S. Pat. No. 4,272,971, which discloses a drive shaft wherein the fiber reinforcing layer is applied to the inside surface of an aluminum tube.

While the above-discussed fiber-reinforced drive shafts have satisfactory operating characteristics, they have been found difficult and expensive to produce on a high volume production basis.

SUMMARY OF THE INVENTION

The present invention relates to a unique fiber reinforced aluminum drive shaft, along with a unique method for producing such drive shafts on a production basis.

The drive shaft of the present invention includes a cylindrical metal tube having a longitudinal axis which, in the preferred embodiment of the invention, is typically constructed of aluminum. An isolation layer of cloth material surrounds the aluminum tube and is adhered to the outer surface of the tube. A reinforcing fiber layer also surrounds the tube and is adhered to the outer surface of the isolation layer. In accordance with the present invention, the reinforcing fiber layer includes a plurality of individual reinforcing graphite fibers which are orientated parallel to the longitudinal axis of the tube and are uniformly positioned about the circumference of the tube. In the above discussed prior art, the graphite fibers were specifically located nonparallel with the longitudinal axis. Finally, the drive shaft includes a covering layer of fiber material surrounding the tube and adhered to the outer surface of the reinforcing fiber layer.

The present invention includes a unique approach to producing the fiber reinforced drive shafts on a production basis. In the method of the present invention, a plurality of cylindrical metal tubes each having a longitudinal axis are coupled to one another in an end-to-end relationship by a plurality of joining plastic plug members to form a longitudinally extending series of metal tubes. The series of metal tubes are fed along a longitudinal path through an apparatus for applying the individual layers of the composite fiber sleeve to the tube.

Initially, the isolation layer of cloth material is applied around the outer surface of the tube. Next, the plurality of individual reinforcing fibers are applied about the circumference of the tube such that the individual reinforcing fibers are parallel to the longitudinal axis of the tubes. Next, the covering layer of fiber material is applied around the outer surface of the reinforcing fiber layer.

While the individual layers are being applied to the tube, a vinylester liquid resin material is applied to saturate the individual layers, and the drive shaft having the saturated layers applied thereto is then passed through a heated forming die wherein the liquid resin is cured to firmly adhere the individual layers to the series of tubes. As the series of tubes having the cured composite sleeve thereon exits the apparatus, the tubes are severed at each of the joining plugs to produce a plurality of individual fiber reinforced drive shafts. In some instances, wherein a connecting member such as a yoke portion or a splined shaft is to be welded to the end of the drive shafts, it has been found desirable to strip a selected end portion of the composite reinforcing layer from tee drive shaft to prevent heat damage to the end of the composite sleeve during the welding operation.

The present invention also concerns alternate methods of manufacturing the drive shafts.

BRIEF DESCRIPTION OF THE DRAWINGS

The above, as well as other advantages of the present invention, will become readily apparent to one skilled in the art from the following detailed description of the preferred embodiments of the invention when considered in light of the accompanying drawings, in which:

FIG. 1 is a side elevational view of a fiber reinforced composite tubular element of the present invention, shown for use as a drive shaft;

FIG. 2 is a fragmentary sectional view taken along line 2—2 in FIG. 1 and showing the individual layers which constitute the preferred embodiment of the fiber composite sleeve;

FIG. 3 is a schematic diagram showing one method of fabricating the fiber composite tubular element of the invention on a continuous basis wherein the fiber composite sleeve is formed and cured about a series of individual metal tubes temporarily joined together and moving in a longitudinal path;

DESCRIPTION OF THE PREFERRED EMBODIMENTS

Figure 5:
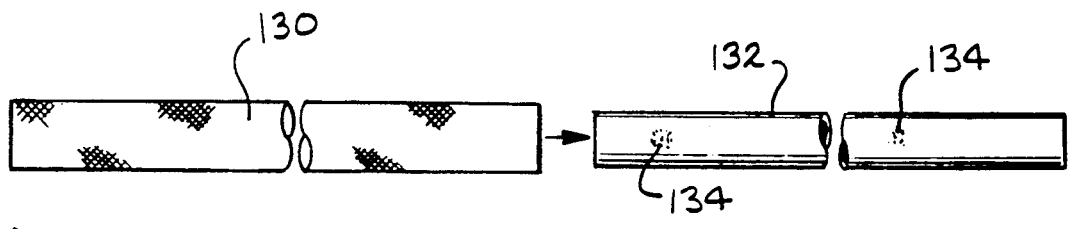
FIG. 5 is a schematic drawing which illustrates an alternate method of assembly of the drive shaft wherein individual previously formed and cured fiber composite sleeves are slipped over and adhesively secured to an associated metal tube.

Referring now to FIG. 1, there is shown a drive shaft 10 which utilizes a composite tubular element embodying the features of the present invention. The drive shaft 10 includes an outer composite fiber reinforcing sleeve 12 which surrounds and is attached to the exterior of a cylindrical metal tube 14. As illustrated, first and second connecting members 16 and 18, which are shown as yoke portions, are connected to opposite ends of the metal tube 14 for coupling the drive shaft between a drive member (not shown) and a driven member (not shown). While the connecting members are shown as yoke portions for connection to an associated universal joint assembly (not shown), it will be appreciated that other types of connecting members such as, for example, a splined shaft end can be used.

The connecting members 16 and 18 are typically secured to the ends of the metal tube 14 by a welding operation. To prevent heat damage to the composite sleeve 12 when the connecting members are attached, the ends of the reinforcing sleeve 12 are spaced inwardly from the ends of the metal tube 14 to provide exposed metal end portions 20 and 22. As will appear more fully below, in the preferred method of manufacture, the reinforcing sleeve 12 is initially formed along the entire length of the metal tube 14 and is subsequently stripped from the end portions 20 and 22 by severing it circumferentially with a saw, and peeling it off. In other methods of manufacture, the reinforcing sleeve 12 is formed so that it initially does not cover end portions 20 and 22.

Turning now to FIG. 2, there is shown a cross-section through the tube 14 and the preferred embodiment of the composite reinforcing sleeve 12. Typically, the metal tube 14 is a cylindrical aluminum tube fabricated in a conventional manner. The length, diameter, and wall thickness of the tube, along with the particular aluminum alloy from which the tube is formed, may vary from application to application, depending on the particular power transmission requirements of the drive shaft. In any event, the use of the composite reinforcing sleeve 12 having the specific construction of the present invention has been found to sufficiently increase the axial stiffness of the aluminum tube such that weight of the tube can be substantially reduced as compared with a tubular aluminum drive shaft without the reinforcing sleeve.

The composite reinforcing sleeve 12 basically consists of three sections: an isolation layer 32, a fiber reinforcing layer 34, and a covering layer 36. As will be discussed, in the preferred method of manufacture, the individual layers of the sleeve 12 are bonded to one another and the tube by a vinylester resin.

The isolation layer 32 includes individual layers 32a, 32b, and 32c. The first isolation layer 32a is composed of a plurality of longitudinally extending threads of string material equally spaced about the circumference of the tube. This layer is not essential to the functioning of the invention but, as will be discussed, is provided as a visual indicator to avoid contact of a saw blade (not shown) with the metal tube 14 when striping the end portions of the reinforcing sleeve 12 as previously described. In the preferred embodiment of the drive shaft, the layer 32a consists of eight longitudinally extending polyester strings equally spaced about the circumference of the tube.

The second isolation layer 32b is composed of individual strips of a thin screen-like cloth material which extend longitudinally and have overlapping lateral edge portions to completely surround the tube. This layer functions to isolate the fiber reinforcing layer 34, which is typically graphite, from the aluminum tube 14, since it has been found that direct contact between graphite and aluminum results in undesirable electrolytic corrosion. The exact width of the individual strips will be dependent on the number of strips utilized, along with the outside diameter of the tube. While the number of strips of cloth material which are utilized to surround the tube can vary from application to application, in the preferred embodiment, four individual strips of cloth material are utilized.

The third isolation layer 32c is similar to the first layer 32a, and is comprised of a plurality of longitudinally disposed threads of polyester string uniformally spaced about the circumference of the tube. In the preferred embodiment, eight threads are used. Again, this is not an essential layer, but is provided to form and hold the strips of cloth material in place on the metal tube 14. It will be appreciated that, while the isolation string layers 32a and 32c are shown in FIG. 2 as spacing the isolation cloth layer 32b from both the tube 14 and the fiber reinforcing layer 34, there is actually contact between the layer 32b and the tube 14 and between the layer 32b and the reinforcing layer 34 in the regions between the spaced apart longitudinally extending threads.

The fiber reinforcing layer 34 is typically comprised of graphite and includes a plurality of individual and independent reinforcing fiber strands or "tows" which, in accordance with the present invention, are preferably located parallel to the longitudinal axis of the tube, and uniformly positioned about the isolation layer 32. Each tow consists of a predetermined number of longitudinally disposed, individual graphite fibers. The exact number of tows of graphite which are utilized will depend on the number of individual fibers located in each tow and the overall amount of reinforcing which is desired. In one preferred embodiment, 115 longitudinally disposed tows of graphite fibers are utilized, with each tow being composed of 36,000 individual fibers of graphite.

The covering or protective layer 36 includes individual layers 36a, 36b, and 36c, and functions as a means for retaining the longitudinal graphite strands of the layer 34 adjacent the metal tube 14. The first covering layer 36a is comprised of a circumferential wrapping of fiberglass strands. The number of circumferential wrappings per given length of the tube will be dependent on the amount of graphite which has been applied to the tube, along with the number of individual glass fibers included in each strand. In the preferred embodiment, each strand is composed of 1,800 continuous glass filaments, and is wrapped about the tube to produce twenty wraps per longitudinal inch.

The second covering layer 36b is another circumferential wrapping, similar to that of the first covering layer 36a, but with polyester string, of a type similar to that used in the first and third isolation layers 32a and 32c. It should be noted that the layers 36a and 36b, although illustrated as overlying layers, do not visually form separate layers, since the strands of one wrapping will typically fall in between the strands of the other, so that layers 36a and 36b appear visually as a single layer.

The third covering layer 36c, which is the outermost layer of the sleeve 12, is applied similarly to and is identical in material characteristics to that of the isolation layer 32b, and provides an outer cloth covering which produces a smooth outer surface on the drive shaft.

Turning now to FIG. 3, there is shown schematically an apparatus 40 for forming composite tubular elements of the type illustrated in FIG. 2 on a continuous basis. As shown in FIG. 3, a plurality of metal tubes, shown as 14a, 14b, 14c, 14d, are interconnected in an end-to-end relationship by a plurality of plug members 42. The plug members 42, which typically are constructed of a plastic material, are shown as double-ended, with a centrally located protruding annular flange portion 44 having an outer diameter greater than the outside diameter of the tubes. As will be discussed, the protruding flange portion 44, after each layer of the composite sleeve has been applied and cured on the tubes, provides an annular raised portion in the sleeve which functions as a visual reference to define the specific location at which the tubes must be sawed apart.

The apparatus 40 includes a plurality of individual application stations which, as discussed in more detail below, are utilized to apply the various materials required to form the composite fiber sleeve on the aluminum tube. The apparatus also includes a pair of pulling rollers 46 and 48 for pulling the longitudinally extending series of tubes through the apparatus along a longitudinally extending path at a predetermined speed.

As shown in FIG. 3, at first station 50, the first isolation layer 32a of longitudinally extending, circumferentially spaced apart string is applied. String from a plurality of rolls 52 passes through a guide means 54 and an application means 56, which may be pulleys or the like, into place on the tube 14. Although four rolls are shown, eight rolls are used in the preferred embodiment of the invention. Also, while shown as tapered rolls or spools, the spools used are preferably of the center-feed type, so that the last turn is on the outside, and additional rolls can be connected without interrupting the process.

Then, at a second station 58, the second isolation layer 32b of strips of cloth material is applied. As shown, the layer 32b is applied in four segments. At the second station 58, the material of the second layer 32b is applied from rolls 60 and 62. While not shown in the drawings, the rolls 62 are preferably located along a line which is perpendicular to the line along which the rolls 60 are located. The individual strips are urged into conformance with the shape of tube 14 by a conical preformer 64.

Next, at a third station 66, the third isolation layer 32c of string is applied to form the cloth layer 32b around the tube 14. As with the first station 50, the string from a plurality of rolls 68 passes through a guide means 70 and an application means 72 into position around the tube 14.

At a fourth station 74, approximately half of the fiber reinforcing layer 34 is applied. A set of rolls 76, although shown as six in number for simplicity, actually number approximately half of the total number of graphite tows to be applied. The tows supplied from the rolls 76 pass through individual apertures in a forming ring 78 into conformance with the shape of the tube 14. Then, at a fifth station 80, a resin mixture is supplied from a tank 82 through a line 84 to a dispensing end 86, from which it coats the first half of the fiber reinforcing layer 34 and the underlying isolation layer 32.

The resin mix contained in the tank 82 is preferably a vinylester resin mix of the type available under the trade name Derakane. A suitable resin mixture is available from Dow Chemical of Joliet, Ill. under part number 411-35. In addition, any conventional resin mixture may be used, although it should be selected from among those that remain flexible after curing. Although not shown in the drawings, a catalyst or hardener can be mixed with the resin mixture shortly before application of the mixture to the partially formed sleeve.

At a sixth station 88, the remainder of the desired number of graphite tows are applied from a set of rolls 90 through a forming ring 92 into conformance with the tube 14 and, at a seventh station 94, are again coated with the resin mixture from the tank 82, through a line 96 and a dispensing end 98.

An eighth station 100 and a ninth station 102 include a spinner head 104 having rolls 106 and 108 for circumferentially wrapping covering layers 36a and 36b respectively. Of course, more than one such spinner head 104 may be provided, and more than a single roll can be used to apply the layers 36a and 36b. As illustrated, the head 104 contains the fiberglass material of the first covering layer 36a on the roll 106 and the polyester string material of the second covering layer 36b on the roll 108. As previously described, the layers 36a and 36b are circumferential wrappings which, in the preferred embodiment, are applied at a rate of approximately twenty per inch. At a tenth station 110, the resin mix from the tank 82 is again applied, through a line 112 and a dispensing end 114.

Then, at an eleventh station 116, the final layer, the third covering layer 36c, is applied. A set of rolls 118 contain cloth material identical to that contained by the rolls 60, which material is urged into conformance with the tube 14 by a conical performer 120. A set of rolls 122 contain cloth material identical to that contained on the rolls 62, which material is urged into conformance with the tube 14 by a conical entrance 124 of a heated forming die 126. As was the case with the rolls 60 and 62, the rolls 118 and 122 are preferably located along lines perpendicular to one another. The forming die 126 not only forms the surface of the continuous drive shaft assembly, but also provides appropriate heat input to effect a rapid cure of the resin mixture as the series of drive shafts are pulled through the apparatus 40.

Figure 4:
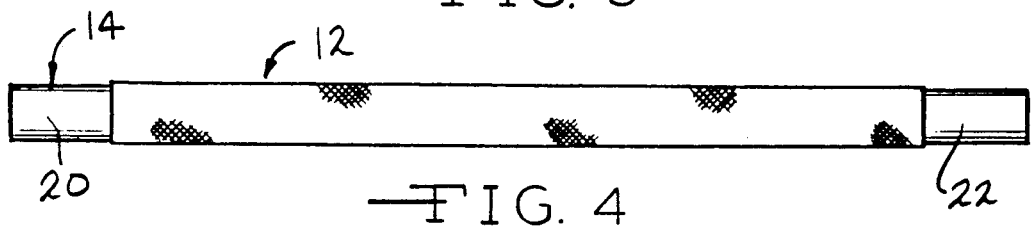
FIG. 4 is a side elevational view of a composite fiber reinforced tubular element produced according to the method schematically illustrated in FIG. 3.

The continuous chain of composite tubular elements 10 is then cut apart at protruding flange portions 48, and stripped in a manner as described above to form exposed metal end portions 20 and 22, to which appropriate connecting members can be attached by conventional welding. The composite tubular element produced by the method of FIG. 3 is shown in FIG. 4 prior to the attachment of the connecting members.

It will be appreciated that other methods can be utilized to produce a fiber-reinforced aluminum drive shaft embodying the principal features of the present invention. For example, FIG. 5 schematically illustrates a method wherein a stiff, performed, precut and previously cured reinforcing sleeve 130 of a predetermined length is provided, with an internal diameter slightly larger than the external diameter of the metal tube 14. As illustrated in FIG. 5, the reinforcing sleeve 130 is slipped into position over a metal tube 132, to which a layer of glue 134 has been applied.

Various types of glues or bonding agents may be used for the glue 134. One such structural adhesive which can be used is commercially known as Metalbond 1133, and is an elastomer modified epoxy material sold by the Narmco division of Celanese Corp, New York, New York. Such adhesives may be applied by brushing or spraying.

Figure 6:
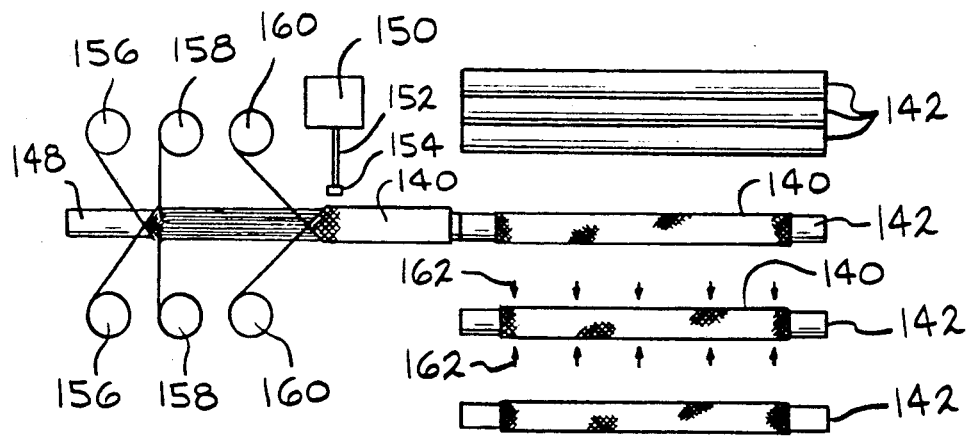
FIG. 6 is a schematic drawing which illustrates a further alternate method of manufacture wherein a preformed and uncured, resin-saturated fiber reinforcing sleeve is slipped over a metal tube member and subsequently cured thereon.

FIG. 6 illustrates schematically a further alternate method of making a composite tubular element according to the invention, in which a fiber-reinforced sleeve 140 saturated with uncured resin, but made to appropriate length, is slipped over a metal tube 142 and is subsequently cured to bond the sleeve 140 to the metal tube 142. If desired, an appropriate structural adhesive may be used to assist in bonding the sleeve to the tube. In FIG. 6, the fiber-reinforced sleeve 140 is formed on a mandrel 148, and is saturated with resin from a tank 150 through a line 152 and a dispensing end 154, or by any other convenient means, such as brushing or spraying. As illustrated, the reinforcing sleeve 140 includes three layers, an inner layer of isolation material applied by rolls 156, an intermediate layer of longitudinally extending reinforcing fiber applied by rolls 158, and an outer layer of covering material applied by rolls 160.

As shown in FIG. 6, there is a supply of metal tubes 142, onto each of which a reinforcing sleeve member 140 is placed by sliding it off mandrel 148 and onto the tube 142, wherein it is urged into position by applying circumferentially forces 162 in any convenient manner, such as by drawing a forming die over it. Then, the reinforcing member 140 is cured in place on the metal tube 142, either by the passage of time without application of heat, or by the application of heat in any convenient manner.

The precise embodiment of the reinforcing sleeve used in the methods illustrated in FIGS. 5 and 6 may differ from the construction shown in FIG. 2 and produced by the method of FIG. 3. For example, the first and third isolation layers 32a and 32c of FIG. 2, which provide a visual indicia for stripping the ends of the sleeve in the method of FIG. 3, would not be required in the methods of FIGS. 5 and 6, since the reinforcing sleeves are formed to length before application to the metal tube. In addition, in some instances, the second isolation layer 32b may also not be necessary, since the glue used to retain a previously formed cured or uncured reinforcing sleeve to a metal tube may by itself provide a suitable isolation layer between the graphite and the aluminum. Also, the outer most covering layer 36c of FIG. 2, which is provided to form a smooth exterior surface is not an absolutely necessity, nor is the use of two different materials, shown as covering layers 36a and 36b to retain the primary reinforcing fiber layer 34 in place.

In accordance with the provisions of the patent statutes, the composite tubular element of the present invention, along with the methods of producing the tubular element, have been illustrated and described in its preferred embodiments. However, it will be appreciated that numerous modifications and variations of the disclosed invention will be apparent to one skilled in the art, including re-arrangement in the ordering of layers and the addition or omission of layers, and may be made without departing from the scope of the attached claims.

What is claimed is:

1. A method of making a fiber reinforced vehicle drive shaft comprising the steps of:
   (a) providing a cylindrical metal tube having a longitudinal tube axis and having particular power transmission requirements for the drive shaft;
   (b) moving the tube along a longitudinal path;
   (c) forming a cylindrical reinforcing sleeve on the tube while the tube travels in the longitudinal path to increase axial stiffness of the metal tube, the sleeve having a longitudinal sleeve axis and including an isolation layer, a reinforcing fiber layer adjacent the reinforcing fiber layer, with the reinforcing fiber layer consisting of a plurality of separate tows individually and uniformly circumferentially positioned around and in parallel relationship to the sleeve axis, and with each of the tows including a plurality of continuous reinforcing fibers;
   (d) securing the cylindrical reinforcing sleeve to a longitudinally extending outer cylindrical surface of the tube while the tube travels in the longitudinal path with the isolation layer adjacent the cylindrical surface of the tube and the tube axis and sleeve axis in coaxial relationship with one another;
   (e) stripping selected end portions of the reinforced fiber sleeve to provide an exposed metal end surface at each end of the metal tube to prevent damage to the reinforcing sleeve upon subsequent attachment of a metal connecting member to the metal tube; and
   (f) securing a separate metal connecting member to each end of the metal tube to produce the drive shaft for attachment to a vehicle drive train component whereby the drive shaft is produced with the metal tube having the particular power transmission requirements for the drive shaft and with the cylindrical reinforcing sleeve for increasing the axial stiffness of the metal tube.

2. The method according to claim 1 wherein step (c) includes the step of forming the isolation layer by positioning individual strips of cloth material longitudinally with overlapping longitudinal edge portions.

3. The method according to claim 2 wherein the step of forming the isolation layer further includes the step of applying an inner and an outer layer on opposite sides of the individual strips, with each of the inner and outer layers comprising a plurality of string members extending longitudinally along the sleeve and circumferentially spaced apart about the longitudinal sleeve axis.

4. The method according to claim 3 wherein step (c) includes the step of forming the covering layer by circumferentially applying a fiberglass string material against the reinforcing fiber layer for maintaining the reinforcing fiber layer adjacent the isolation layer.

5. The method according to claim 4 wherein the step of applying the covering layer further includes the step of applying polyester string material circumferentially against the fiberglass string material.

6. The method according to claim 5 wherein the step of applying the covering layer includes the step applying a cloth material over the polyester string material.

7. The method according to claim 1 and further including the step of applying a liquid resin material to the isolation layer, the reinforcing layer and the covering layer.

8. The method according to claim 7 and further including the step of curing the liquid resin to firmly adhere the isolation layer, the reinforcing fiber layer and the covering layer to the tube.

9. The method according to claim 1 wherein step (a) includes the step providing a plurality of cylindrical metal tubes each having a longitudinal axis, joining the tubes to form a longitudinally extending series of tubes, and moving the tubes along a longitudinal path; and further including, subsequent to step (d), the step of severing the series of tubes to produce a plurality of individual fiber reinforced tubular elements.

10. The method according to claim 9 and further including the step of joining the tubes with a plurality of joining plug members and then, subsequent to step (d), severing each of the joining plug members to separate the tubes.

* * * * *

UNITED STATES PATENT AND TRADEMARK OFFICE
CERTIFICATE OF CORRECTION

PATENT NO. : 5,127,975
DATED : July 7, 1992
INVENTOR(S) : Barry L. Zackrisson and John A. Beckman It is certified that error appears in the above-identified patent and that said Letters Patent is hereby corrected as shown below:

Column 8:
Claim 1, line 12, after "cent the", insert -- isolation layer, and a covering layer adjacent the --.

Signed and Sealed this

Seventh Day of September, 1993

Attest:

BRUCE LEHMAN

Attesting Officer     Commissioner of Patents and Trademarks